(12) United States Patent  (10) Patent No.: US 7,728,619 B1
Tzou et al.  (45) Date of Patent: Jun. 1, 2010

(54) CIRCUIT AND METHOD FOR CASCADING PROGRAMMABLE IMPEDANCE MATCHING IN A MULTI-CHIP SYSTEM

(75) Inventors: Joseph Jengtao Tzou, Mountain View, CA (US); Suresh Parameswaran, Fremont, CA (US); Thinh Dinh Tran, Palo Alto, CA (US)

(73) Assignee: Cypress Semiconductor Corporation

( * ) Notice: Subject to any disclaimer, the term of this patent is extended or adjusted under 35 U.S.C. 154(b) by 0 days.

(21) Appl. No.: 12/059,953

(22) Filed: Mar. 31, 2008

Related U.S. Application Data

(60) Provisional application No. 60/909,351, filed on Mar. 30, 2007.

(51) Int. Cl.
*H03K 17/16* (2006.01)

(52) U.S. Cl. ...................... 326/30; 326/32; 365/185.11; 365/189.11

(58) Field of Classification Search .................... 326/30, 326/86; 365/189.11, 185.11
See application file for complete search history.

(56) References Cited

U.S. PATENT DOCUMENTS

| | | | |
|---|---|---|---|
| 6,057,705 A | 5/2000 | Wojewoda et al. | |
| 6,075,393 A * | 6/2000 | Tomita et al. | 327/153 |
| 6,477,592 B1 * | 11/2002 | Chen et al. | 710/52 |
| 6,492,853 B1 | 12/2002 | Latham et al. | |
| 6,657,470 B1 | 12/2003 | Latham et al. | |
| 6,854,030 B2 * | 2/2005 | Perino et al. | 710/110 |
| 7,068,064 B1 * | 6/2006 | Yen | 326/30 |
| 7,161,851 B2 * | 1/2007 | Peterson et al. | 365/189.11 |
| 7,209,983 B2 * | 4/2007 | Au et al. | 710/52 |
| 7,478,193 B2 * | 1/2009 | Becca et al. | 711/108 |
| 2007/0165457 A1 * | 7/2007 | Kim | 365/185.11 |

OTHER PUBLICATIONS

USPTO Notice of Allowance for U.S. Appl. No. 10/022,880 (CD01110C) dated Jul. 29, 2002; 4 pages.
USPTO Notice of Allowance for U.S. Appl. No. 10/306,364 (CD01110C) dated Jul. 14, 2003; 1 page.
USPTO Non-Final Rejection for U.S. Appl. No. 10/306,364 (CD01110C) dated Mar. 27, 2003; 3 pages.

* cited by examiner

*Primary Examiner*—Vibol Tan

(57) ABSTRACT

An improved circuit and method for programmable cascading of impedance matching in a multi-chip configuration are disclosed. Handshaking is implemented in cascaded chips by defining a master-slave configuration, and impedance is evaluated in cascaded chips in a non-overlapping manner. The circuit includes a plurality of chips arranged in a cascading configuration. A cascade output pin of a chip is coupled to a cascade input pin of a cascaded chip to enable handshaking between the plurality of chips. The plurality of chips are coupled to a common precision resistor via a common impedance line to enable each chip to calibrate impedance of the chip. Each of the plurality of chips includes a control circuit. Each control circuit includes a state machine circuit. The control circuit is configured to control a non-overlapping clock cycle of each chip during which the impedance of the chip is evaluated.

18 Claims, 8 Drawing Sheets

CIRCUIT AND METHOD FOR CASCADING PROGRAMMABLE IMPEDANCE MATCHING IN A MULTI-CHIP SYSTEM

This application claims priority under 35 U.S.C. § 119(e) to U.S. Provisional Application No. 60/909,351, filed on Mar. 30, 2007, the entire contents of which are hereby incorporated by reference herein.

BACKGROUND

1. Field of the Invention

The present invention relates to semiconductor memory devices. More particularly, the present invention relates to a method and circuit for cascading programmable impedance matching in a multi-chip memory system.

2. Background Information

A conventional Double Data Rate (DDR) static random access memory (SRAM) is a type of synchronous SRAM computer memory that can transfer up to two words of data in each access. A conventional Quad Data Rate (QDR) SRAM can transfer up to four words of data in each access. Conventional DDR and QDR SRAMs transfer data on both rising and falling edges of the clock signal, which doubles the maximum data transfer rate. These memory chips provide high performance architectures targeted at the next generation of, for example, switches and routers. Compared to existing memory solutions, QDR SRAMs are expected to greatly increase system memory bandwidth as well as serve as the main memory for lookup tables, linked lists, and controller buffer memory applications.

FIG. 1 illustrates a conventional system 100 for implementing impedance matching in memory devices. The conventional system 100 comprises a first QDR chip 102 coupled to second, third, and fourth QDR chips 104, 106, and 108, respectively, via a plurality of pull up program lines (e.g., PU_prog <0:n>). The first QDR chip 102 is configured to operate as a master chip which is coupled to a plurality of QDR chips 104, 106, and 108 that are configured to operate as slave chips. The impedance pin ZQ i2 of the first QDR chip 102 is coupled to a precision resistor Rq 110. No other QDR chips in the conventional system 100 are coupled to the precision resistor Rq 110. A pull up impedance calibration for the output driver is performed on the master QDR chip 102, and the impedance program lines are sent to the slave QDR chips 104, 106, and 108. Since, the ZQ pin i2 of the master QDR chip 102 is coupled to the precision resistor Rq 110, the impedance matching is performed by the master QDR chip 102 only, and the pull-up programming of the impedance is performed and transmitted to the plurality of slave QDR chips 104, 106, and 108 via the plurality of pull up program lines. A pull down programming of the impedance for the output driver is performed locally within every QDR chip. A disadvantage of the conventional system 100 is that there is an overhead of extra pins on each chip and multiple program lines on the board. Another disadvantage of the system 100 is that driver impedance mismatch between dies due to process, voltage, and temperature (PVT) variation is not compensated.

FIG. 2 illustrates a second conventional circuit 200 for implementing impedance matching in memory devices. The second conventional circuit 200 comprises a first QDR chip 202 coupled to second, third, and fourth QDR chips 204, 206, and 208, respectively, serially via signal lines, such as, for example, a clock signal zqclk 13, a load signal zqload i4 and a serial data signal zqdata i5. The first QDR chip 202 is configured to operate as the master chip and other QDR chips (204, 206, and 208) are configured to operate as slave chips. The pull up driver impedance calibration is performed on the master and is transmitted serially via the signal lines to the plurality of QDR chips 204, 206, and 208. The ZQ pin i2 of the master QDR chip 202 is coupled to the precision resistor Rq 210, and the impedance matching is performed by the first QDR chip 202 only. A pull up and pull down driver impedance calibration is also performed by the first QDR chip 202 only. A disadvantage of the circuit 200 is that there is an overhead of extra pins and multiple lines on the circuit board. Another disadvantage of system 200 is that driver impedance mismatch between dies due to PVT variation is not compensated.

SUMMARY OF THE INVENTION

A circuit and method for cascading programmable impedance matching in a multi-chip system are disclosed. In accordance with exemplary embodiments of the present invention, according to a first aspect of the present invention, a programmable impedance matching circuit includes a plurality of chips arranged in a cascading configuration. A cascade output pin (e.g., impedance output pin) of a chip is coupled to a cascade input pin (e.g., impedance input pin) of a cascaded chip to enable handshaking between the plurality of chips. The plurality of chips are coupled to a common precision resistor via a common impedance line to enable each chip to calibrate an impedance of the chip. Each of the plurality of chips includes a control circuit. The control circuit includes a state machine circuit. The control circuit is configured to control a non-overlapping clock cycle of each chip during which the impedance of the chip is evaluated.

According to the first aspect, the plurality of chips can be coupled in a master-slave configuration. Each control circuit can include a pull up driver and a pull down driver. The state machine circuit is coupled to both the pull up and the pull down drivers. The plurality of chips can comprise, for example, dual data rate (DDR) memory chips and/or quad data rate (QDR) memory chips. The master chip of the plurality of chips is configured to receive a ground level signal. The control circuit of each of chip is configured to regulate Output impedance. The control circuit is configured to control the corresponding state machine to operate each chip with a gap of n clock cycles from one another, wherein n comprises an integer. A non-overlapping impedance evaluation is performed by the control circuit of each of the plurality of chips. A gap of n clock cycles is maintained between cascaded chips, and wherein n comprises a numerical value.

According to a second aspect of the present invention, a system for programmable impedance matching includes a plurality of chips arranged in a cascaded configuration. Each chip includes a cascade input pin and a cascade output pin. The plurality of cascaded chips is coupled to a common precision resistor. Each of the plurality of cascaded chips comprises an impedance controlling state machine. Each impedance controlling state machine is configured to operate during a non-overlapping clock cycle. The system is configured to regulate output driver impedance for the multi-chip cascaded configuration.

According to the second aspect, the system can be configured to provide compensation for process, voltage and temperature (PVT) variations between the plurality of cascaded chips. The plurality of cascaded chips can comprise, for example, a plurality static random access memory (SRAM) chips. For example, the plurality of SRAM chips can comprise DDR memory chips or QDR memory chips. The system can also include a control circuit in communication with the plurality of cascaded chips. The control circuit is configured to perform a pull up and a pull down impedance evaluation in each of the plurality of chips. One of the plurality of cascaded chips can be configured as a master chip. The remaining ones of the plurality of cascaded chips can be configured as slave chips.

According to a third aspect of the present invention, a method of programmable impedance matching in a plurality of cascaded chips includes the steps of: resetting a control state machine in each of the plurality of cascaded chips after a power-up signal, wherein the control state machines are reset during a first period of non-overlapping clock cycles; and performing an impedance evaluation for each of the plurality of cascaded chips during second period of non-overlapping clock cycles.

According to the third aspect, the non-overlapping clock cycles can each be of length n, wherein n can comprise an integer. The step of performing can comprise the step of terminating a common impedance line of the plurality of cascaded chips with a common precision resistor. Additionally or alternatively, the step of performing can comprise the step of turning on a pull up replica for each of the plurality of cascaded chips. The step of turning on can comprise the steps of: evaluating a pull up replica for a master chip during a first clock cycle; and evaluating pull up replicas for a plurality of slave chips during a plurality of clock cycles occurring after the first clock cycle, wherein both the first clock cycle and each of the plurality of clock cycles are non-overlapping.

According to a fourth aspect of the present invention, a method of implementing programmable impedance matching in a cascaded multi-chip circuit includes the steps of: generating a master-slave configuration for the cascaded multi-chip circuit; calibrating impedance in each chip of the cascaded multi-chip circuit in a non-overlapping manner; and evaluating impedance for each chip of the cascaded multi-chip circuit in a non-overlapping manner.

According to the fourth aspect, the step of calibrating impedance can include the step of terminating a common impedance line of the cascaded multi-chip circuit with a common precision resistance. The step of generating can include the step of coupling a cascade output of a chip to a cascade input of a cascaded chip to enable handshaking within the cascaded multi-chip circuit.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to an improved circuit and method for cascading programmable impedance matching in a multi-chip system. The improved circuit includes a plurality of chips arranged in a cascading configuration. A cascade output pin (e.g., impedance output pin) of a chip is coupled to a cascade input pin (e.g., impedance input pin) of a cascaded chip to enable handshaking between the plurality of chips. The plurality of chips are coupled to a common precision resistor via a common impedance line to enable each chip to calibrate the impedance of the chip. Each of the plurality of chips includes a control circuit. Each control circuit includes a state machine circuit. The control circuit is configured to control a non-overlapping clock cycle of each chip during which the impedance of the chip is evaluated. The multi-chip circuit is capable of providing compensation for process, voltage and temperature (PVT) variation in each chip between the cascaded chips.

Figure 1:
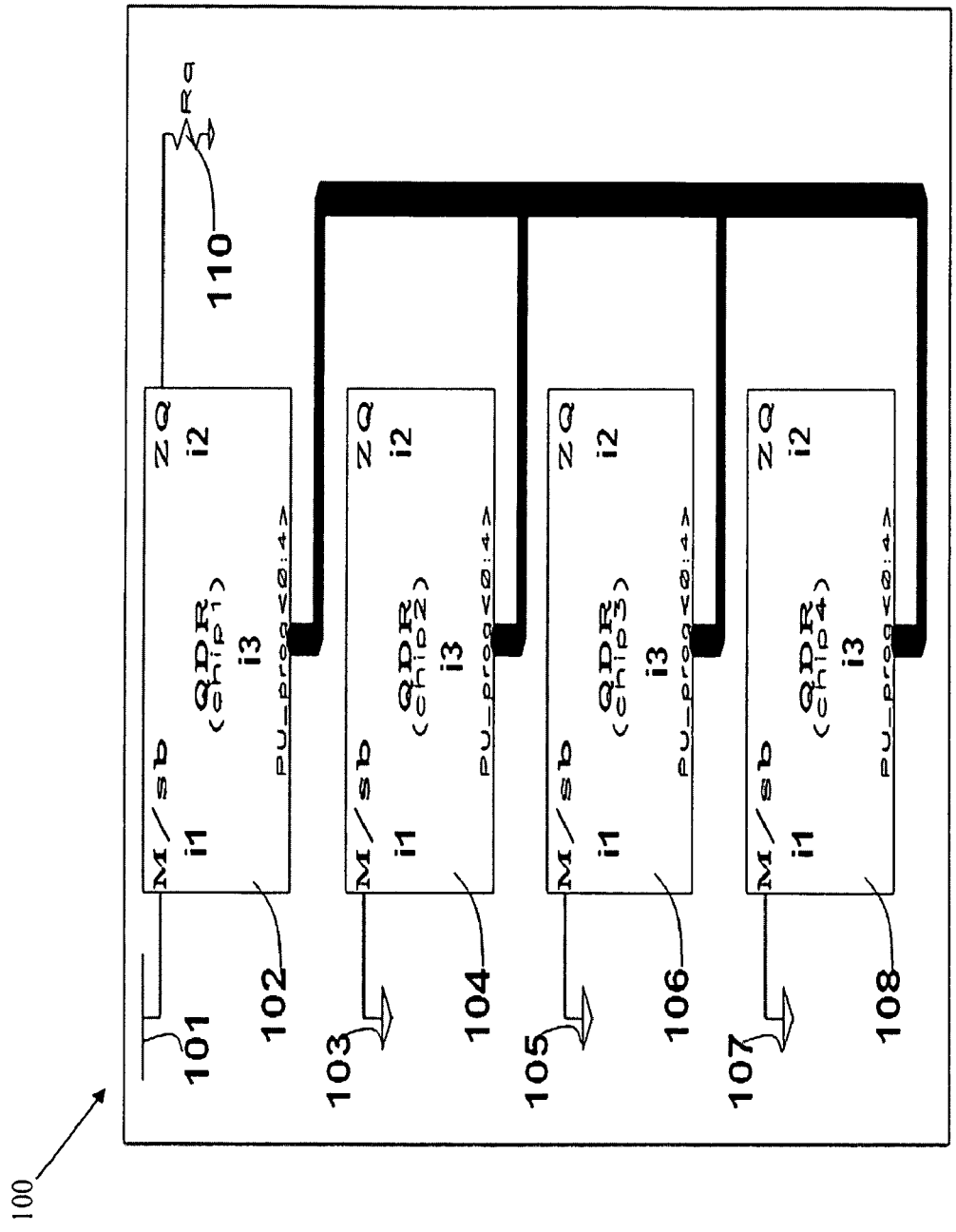
FIG. 1 illustrates a circuit diagram depicting a conventional system for implementing impedance matching in multi-chip module.
Figure 2:
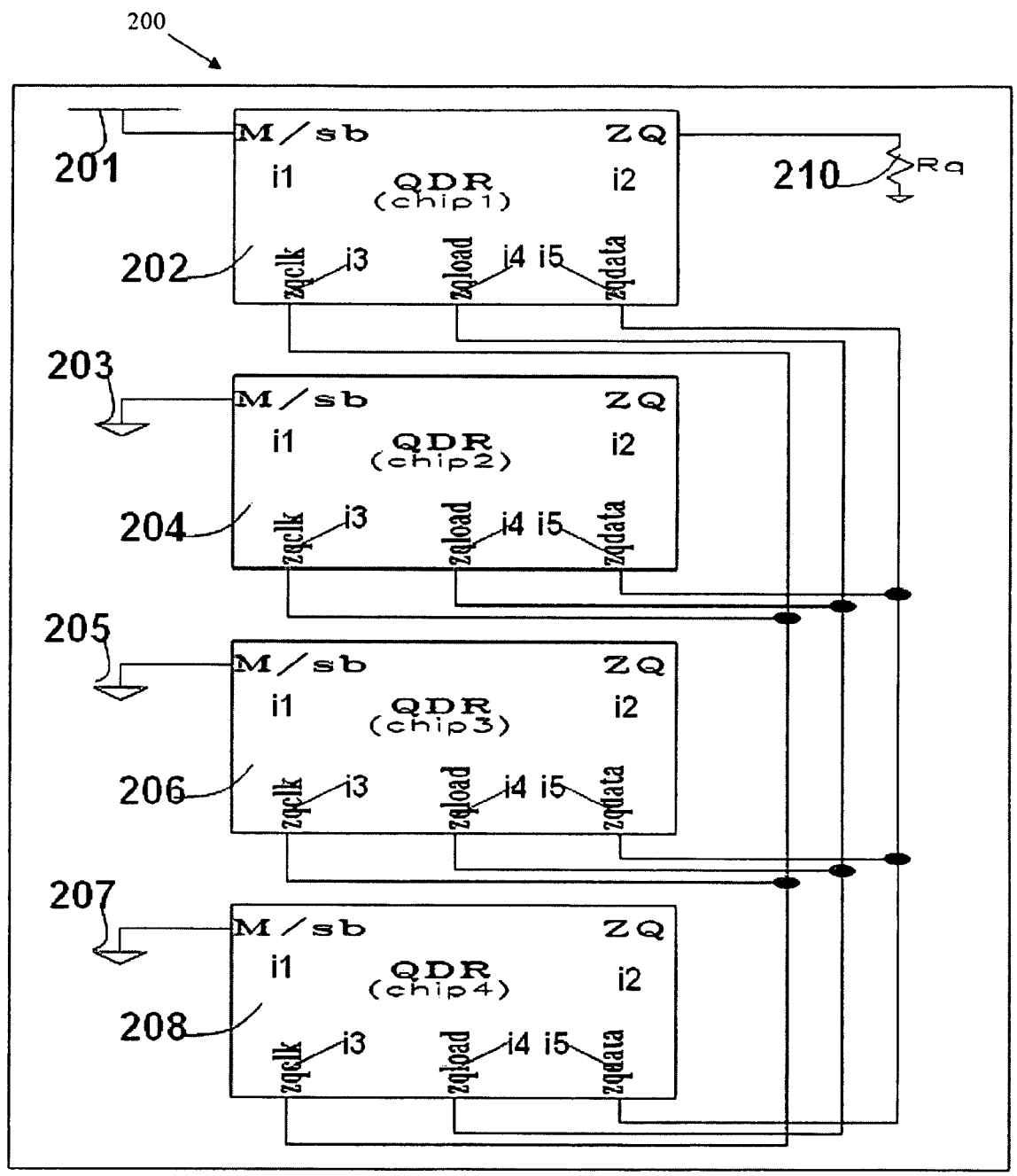
FIG. 2 illustrates a circuit diagram depicting a conventional system for implementing impedance matching in a multi-chip module.
Figure 3:
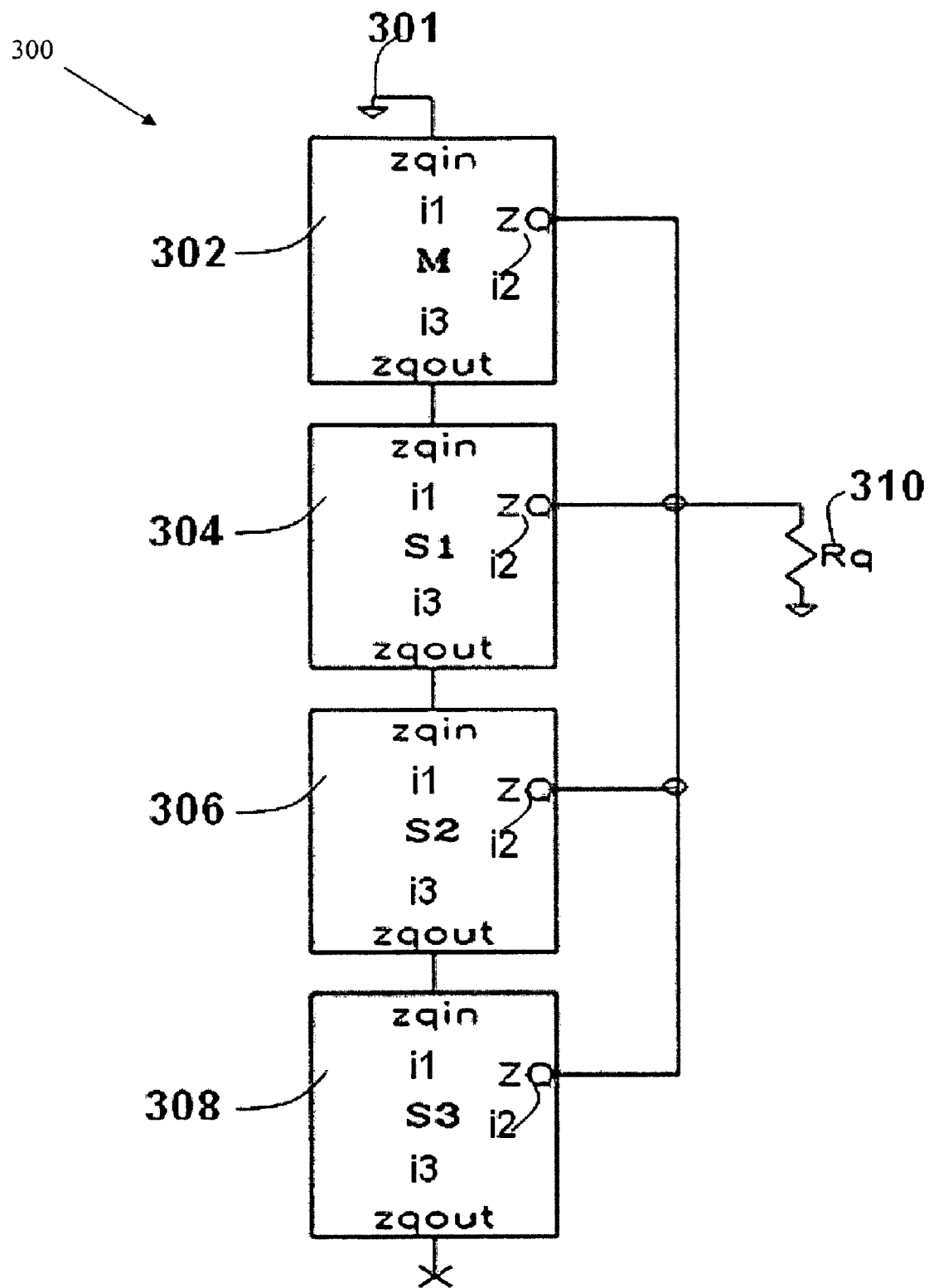
FIG. 3 illustrates a circuit diagram depicting an improved circuit for implementing impedance matching in a multi-chip module according to an embodiment of the present invention.

These and other aspects of the present invention will now be described in greater detail with reference to detailed description of the preferred embodiments of the invention. FIG. 3 illustrates a circuit 300 for cascading programmable impedance matching in a multi-chip module according to an exemplary embodiment of the invention. The circuit 300 comprises a plurality of chips. For purposes of illustration and not limitation, the circuit 300 can include a first chip (M) 302, a second chip (S1) 304, a third chip (S2) 306, and a fourth chip (S3) 308, although any suitable number of chips can be used with the present invention. The plurality of chips 302, 304, 306, and 308 comprises a plurality of input and output terminals that are configured to enable handshaking between the chips. In particular, each of the plurality of chips 302, 304, 306, and 308 can include a cascade input pin zqin i1 and a cascade output pin zqout i3. According to an exemplary embodiment, the plurality of chips 302, 304, 306, and 308 are arranged in a cascading configuration. For example, the cascade input pin zqin i1 of the first chip 302 can be coupled to ground. The cascade output pin zqout i3 of the first chip 302 can be coupled to the cascade input pin zqin i1 of the second chip 304. The cascade output pin zqout i3 of the second chip 304 can be coupled to the cascade input pin zqin i1 of the third chip 306. The cascade output pin zqout i3 of the third chip 306 can be coupled to the cascade input pin zqin i1 of the fourth chip 308. Any suitable number of chips can be cascaded or otherwise coupled in such a manner.

Each of the plurality of chips 302, 304, 306, and 308 includes a respective analog input/output ZQ pin i2. Each of the chips is coupled to a suitable common precision resistor Rq 310 using a common impedance line via the respective ZQ pins i2. According to an exemplary embodiment of the present invention, the plurality of chips 302, 304, 306, and 308 are connected in a master and slave configuration. For example, the first chip (M) 302 can be configured as a master chip (M), while the second chip 304 (S1), the third chip 306 (S2), and the fourth chip 308 (S4) can be configured as slave chips.

Each of the plurality of chips 302, 304, 306, and 308 can include a suitable control circuit. According to an alternative exemplary embodiment, a separate control circuit external to the plurality of chips 302, 304, 306, and 308 can be used to suitably control the chips in the manner described herein. The control circuit comprises impedance (ZQ) circuitry. The impedance circuitry is configured to regulate the output driver impedance in accordance with the common precision resistor Rq 310 and to allow the matching of the driver impedance to that of the transmission line being driven. The control circuit is further configured to generate a clock cycle phase difference and enable a non-overlapping impedance evaluation. According to an exemplary embodiment, the control circuit comprises a state machine circuit. The impedance circuitry of each control circuit can further comprise replica pull up drivers and pull down drivers. According to an exemplary embodiment, the replica pull up drivers and pull down drivers can comprise, for example, a plurality of resistors and a plurality of transistors. According to an exemplary embodiment, the replica pull up drivers and pull down drivers can comprise a resistor-to-transistor ratio of, for example, 1:5, although any suitable ratio can be used. The impedance circuitry can also include the analog input/output pin ZQ pin i2. As discussed previously, the ZQ pin i2 of each of the plurality of chips 302, 304, 306, and 308 is coupled to the common precision resistor Rq 310.

As discussed previously, the plurality of chips 302, 304, 306, and 308 comprises a plurality of terminals that are configured to enable handshaking. Each chip comprises an input pin zqin i1 and an output pin zqout i3. The input pins zqin i1 and output pins zqout i3 are utilized for handshaking between the cascaded chips 302, 304, 306, and 308. The first chip 302 comprises an input pin zqin i1 that is coupled to receive an input signal 301 which is grounded. The ZQ pin i2 of the first chip 302 is coupled to the common precision resistor Rq 310. The control circuit of the first chip 302 is configured to regulate the output impedance of the chip, and a suitable output signal is generated by the first chip 302 on its zqout i3 pin. The second chip 304 comprises an input pin zqin i1 that is configured to receive an input signal from the first chip 302. The ZQ pin i2 of the second chip 304 is coupled to the common precision resistor Rq 310. The control circuit of the second chip 304 is configured to regulate the output impedance of the chip, and a suitable output signal is generated by the second chip 306 on its zqout i3 pin. The third chip 306 comprises an input pin zqin i1 that is configured to receive an input signal from the second chip 304. The ZQ pin i2 of the third chip 306 is coupled to the common precision resistor Rq 310. The control circuit of the third chip 306 is configured to regulate the output impedance of the chip, and an output signal is generated by the third chip 306 on its zqout i3. The fourth chip 308 comprises an input pin zqin i1 that is configured to receive an input signal from the third chip 306. The ZQ pin i2 of the fourth chip 308 is coupled to the common precision resistor Rq 310. The control circuit of the fourth chip 308 is configured to regulate the output impedance of the chip, and an output signal is generated by the fourth chip 308 on its zqout i3. Thus, the cascade input pins zqin i1 and the cascade output pins zqout i3 of the plurality of chips are utilized to communicate between the cascaded chips in the multi-chip module of circuit 300.

Each control state machine in each of the plurality of chips in the circuit 300 is configured to operate with a gap of a predetermined number of clock cycles. According to an exemplary embodiment, the gap can comprise 16 clock cycles, although any suitable number of clock cycles can be used for the gap. For example, the first chip 302 can regulate its output impedance and generate its output signal on the zqout i3 pin after 16 clock cycles. The second chip 304 can regulate its output impedance and generate its output signal on the zqout i3 pin after 32 clock cycles. The third chip 306 can regulate its output impedance and generate its output signal on the zqout i3 pin after 48 clock cycles. The fourth chip 308 can regulate its output impedance and generate its output signal on its zqout i3 pin after 64 clock cycles. In such a manner, a gap of 16 (or other suitable number of) clock cycles can be maintained between operation of each chip. According to an alternative exemplary embodiment, a variable length gap of clock cycles can be used among the chips, rather than a constant length gap.

In the circuit 300, a replica pull tip evaluation in the control circuit is performed by each of the chips. The replica pull-up evaluation suitably programs the output impedance of the output drivers. Merely for purposes of illustration and not limitation, the replica pull up evaluation of the first chip 302 can be performed during the first 16 clock cycles, the replica pull up evaluation of the second chip 304 can be performed during the next 16 clock cycles (e.g., clock cycles 17 to 32), the replica pull up evaluation of the third chip 306 can be performed during the next 16 clock cycles (e.g., clock cycles 33 to 48), and the replica pull up evaluation of the fourth chip 308 can be performed during the final 16 clock cycles (e.g., clock cycles 49 to 64). Thus, in accordance with an exemplary embodiment of the present invention, a non-overlapping impedance evaluation is performed by each of the control circuits for the plurality of chips, since each chip is configured to operate with a gap of a suitable predetermined number of clock cycles from one another.

An advantage of the circuit 300 is that each of the plurality of chips 302, 304, 306, and 308 regulates its own output impedance. A non-overlapping impedance evaluation is performed by each of the plurality of chips 302, 304, 306, and 308 to provide matching of the output impedance. The non-overlapping impedance evaluation eliminates contention in the impedance ZQ pin. Another advantage of the circuit 300 is that each of the plurality of chips 302, 304, 306, and 308 performs its own impedance calibration, thereby providing compensation for PVT variations between the cascaded chips. The circuit 300 requires fewer additional pins at the chip level and fewer additional lines in the module level.

Figure 4:
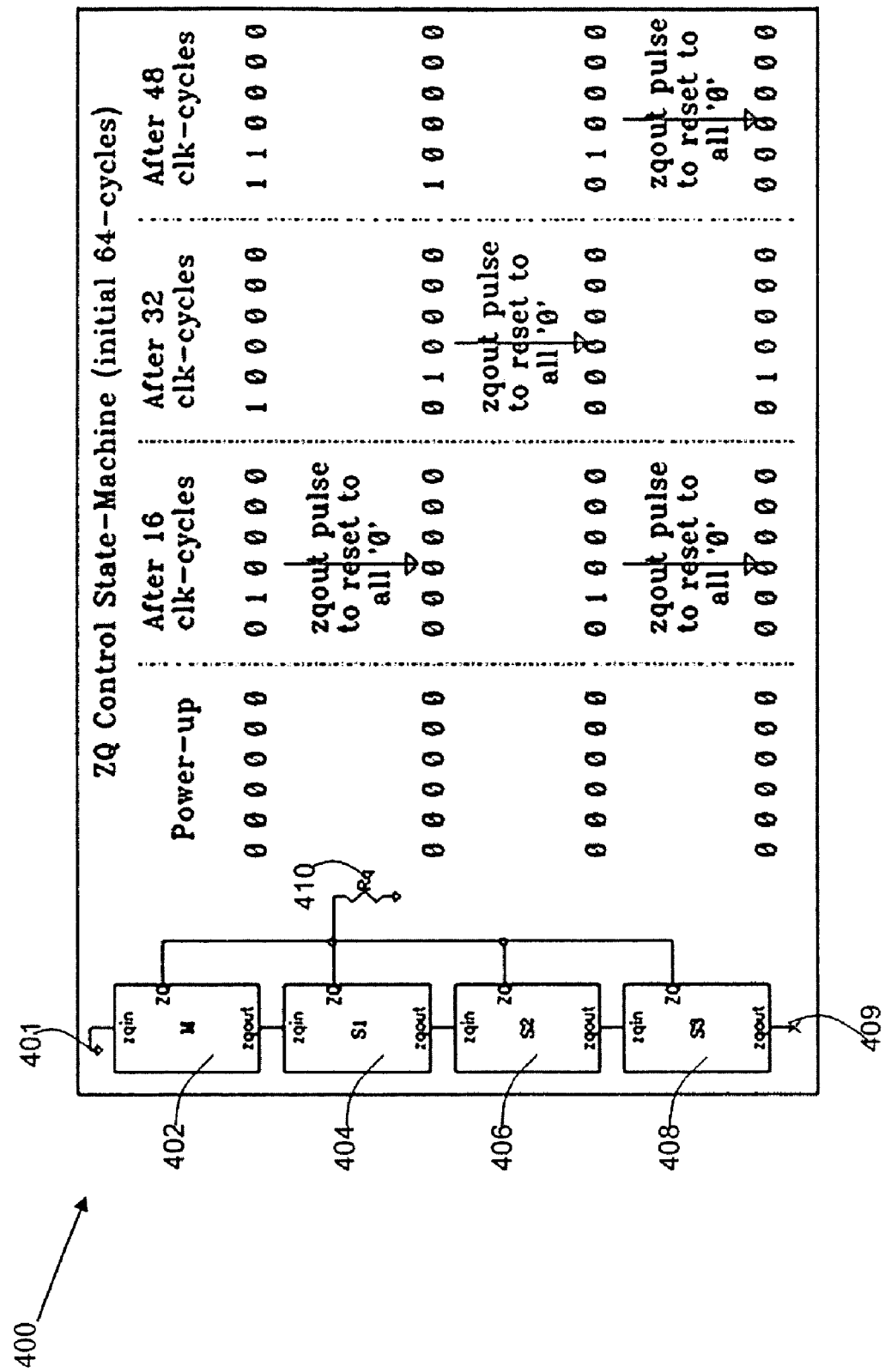
FIG. 4 illustrates a circuit diagram depicting a control state machine diagram for the improved circuit for implementing impedance matching in a multi-chip module according to an embodiment of the present invention.

FIG. 4 illustrates a circuit and timing diagram 400 depicting an initialization of the impedance control state machine of each of the plurality of chips 302, 304, 306, and 308 for an initial 64 clock cycles, in accordance with an exemplary embodiment of the invention. Reference is also made to FIG. 3 in conjunction with circuit and timing diagram of FIG. 4. After power-up, the first (master) chip (402) receives an input signal (zqin) that is configured to reset the first chip (e.g., to all zeroes). An output pulse (zqout) is generated by the first chip at the end of 16 clock cycles. The output pulse of the first chip is provided to a second (slave) chip (404) and is configured to reset the second chip (e.g., to all zeroes). An output pulse (zqout) is generated by the second chip at the end of 32 clock cycles. The output pulse of the second chip is provided to a third (slave) chip (406) and is configured to reset the third chip (e.g., to all zeroes). An output pulse (zqout) is generated by the third chip at the end of 48 clock cycles. The output pulse of the third chip is provided to a fourth (slave) chip (408) and is configured to reset the fourth chip (e.g., to all zeroes). An output pulse (zqout) is generated by the fourth chip at the end of 64 clock cycles. After the non-overlapping impedance calibration/resetting during the initial 64 (or appropriate number of) cycles, a non-overlapping impedance evaluation can be performed for each chip.

Figure 5:
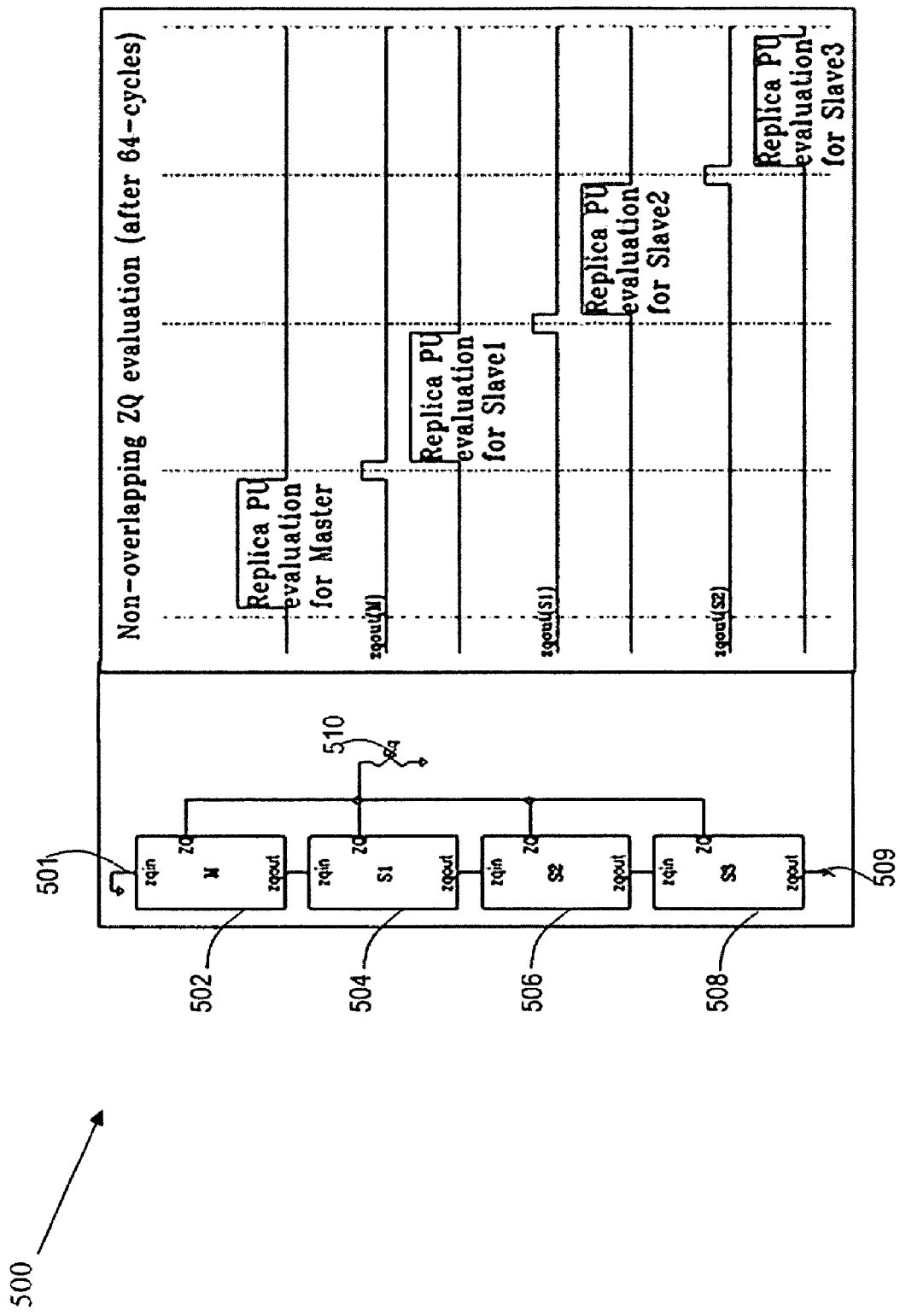
FIG. 5 illustrates a circuit diagram depicting a timing diagram for the improved circuit for implementing impedance matching in a multi-chip module according to an embodiment of the present invention.

FIG. 5 illustrates a circuit and timing diagram 500 depicting a non-overlapping impedance evaluation in a cascaded chip configuration in accordance with an exemplary embodiment of the invention. Reference can be made to the circuit of FIG. 3 for using it in conjunction with the circuit and timing diagram of FIG. 5. According to an exemplary embodiment, a gap of 16 or other suitable number of clock cycles can be maintained between two contiguous chips for evaluating impedance, thereby eliminating contention in the circuit. A replica pull up evaluation is performed by the control circuit of each of the chips. The replica pull up evaluation matches the output impedance of the output drivers. The replica pull up evaluation of the first chip (502) is performed during the first 16 clock cycles, and an output pulse (zqout) is generated at the end of the first 16 clock cycles. The replica pull up evaluation of the second chip (504) is performed during the second 16 clock cycles, and an output pulse (zqout) is generated at the end of the 16*2=32 clock cycles. The replica pull up evaluation of the third chip (506) is performed during the third 16 clock cycles, and an output pulse (zqout) is generated at the end of the 16*3=48 clock cycles. The replica pull up evaluation of the fourth chip (508) is performed during the fourth 16 clock cycles, and an Output pulse (zqout) is generated at the end of the 16*4=64 clock cycles. Thus, according to an exemplary embodiment of the present invention, a non-overlapping impedance evaluation can be performed by each of the control circuits on each of the plurality of chips, in which each chip is configured to operate with a gap of 16 clock cycles from one another, although a gap of any suitable number of clock cycles can be used.

Figure 6:
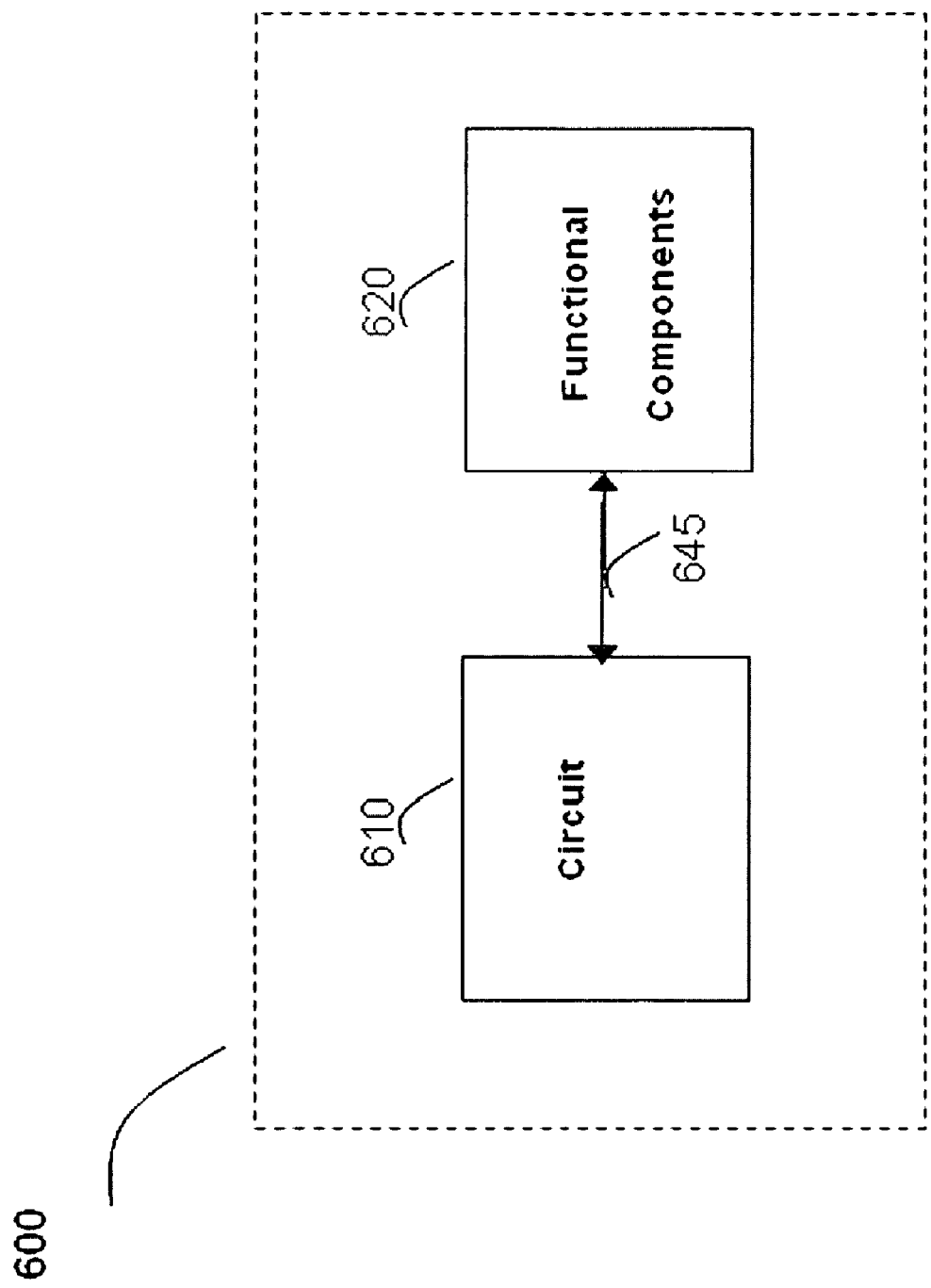
FIG. 6 illustrates a circuit diagram depicting a system with the improved circuit according to an embodiment of the present invention.

FIG. 6 illustrates a system 600 for cascading programmable impedance matching pin in a multi-chip module in accordance with an exemplary embodiment of the present invention. According to an exemplary embodiment of the invention, the system 600 comprises a suitable processor as a subsystem. The processor includes an impedance matching pin cascading circuit 610 as discussed above (e.g., circuit 300) coupled in a bidirectional manner (through an appropriate bus 645) to a plurality of functional components 620. According to an exemplary embodiment, the plurality of functional components 620 can include, for example, a host processor, a memory controller, an address decoder, or the like (or any combination thereof).

Figure 7:
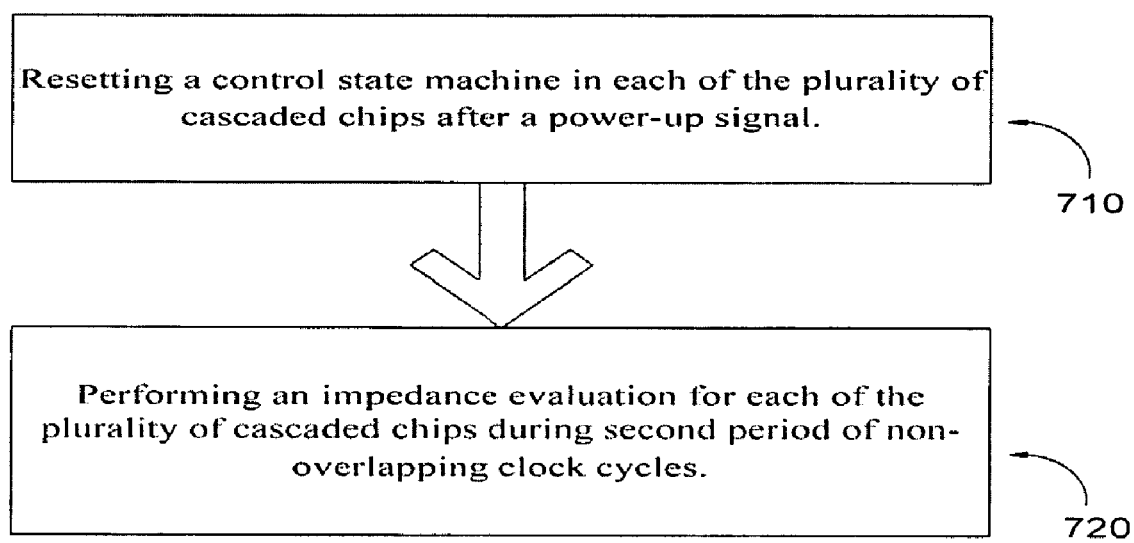
FIG. 7 illustrates a flow chart depicting a method of programmable impedance matching in a plurality of cascaded chips in accordance with an exemplary embodiment of the invention.

FIG. 7 illustrates a flow chart 700 depicting a method of programmable impedance matching in a plurality of cascaded chips in accordance with an exemplary embodiment of the invention. A first step 710 includes resetting a control state machine in each of the plurality of cascaded chips after a power-up signal. The control state machines are reset during a first period of non-overlapping clock cycles. A second step 720 includes performing an impedance evaluation for each of the plurality of cascaded chips during a second period of non-overlapping clock cycles. The non-overlapping clock cycles can each be of length n, where n can comprise a suitable integer. In accordance with an exemplary embodiment, the step of performing can comprise terminating a common impedance line of the plurality of cascaded chips with a common precision resistor. Additionally, the step of performing can comprise turning on a pull up replica for each of the plurality of cascaded chips. The step of turning on can comprise the steps of: evaluating a pull up replica for a master chip during a first clock cycle; and evaluating pull up replicas for a plurality of slave chips during a plurality of clock cycles occurring after the first clock cycle. Both the first clock cycle and each of the plurality of clock cycles are non-overlapping.

Figure 8:
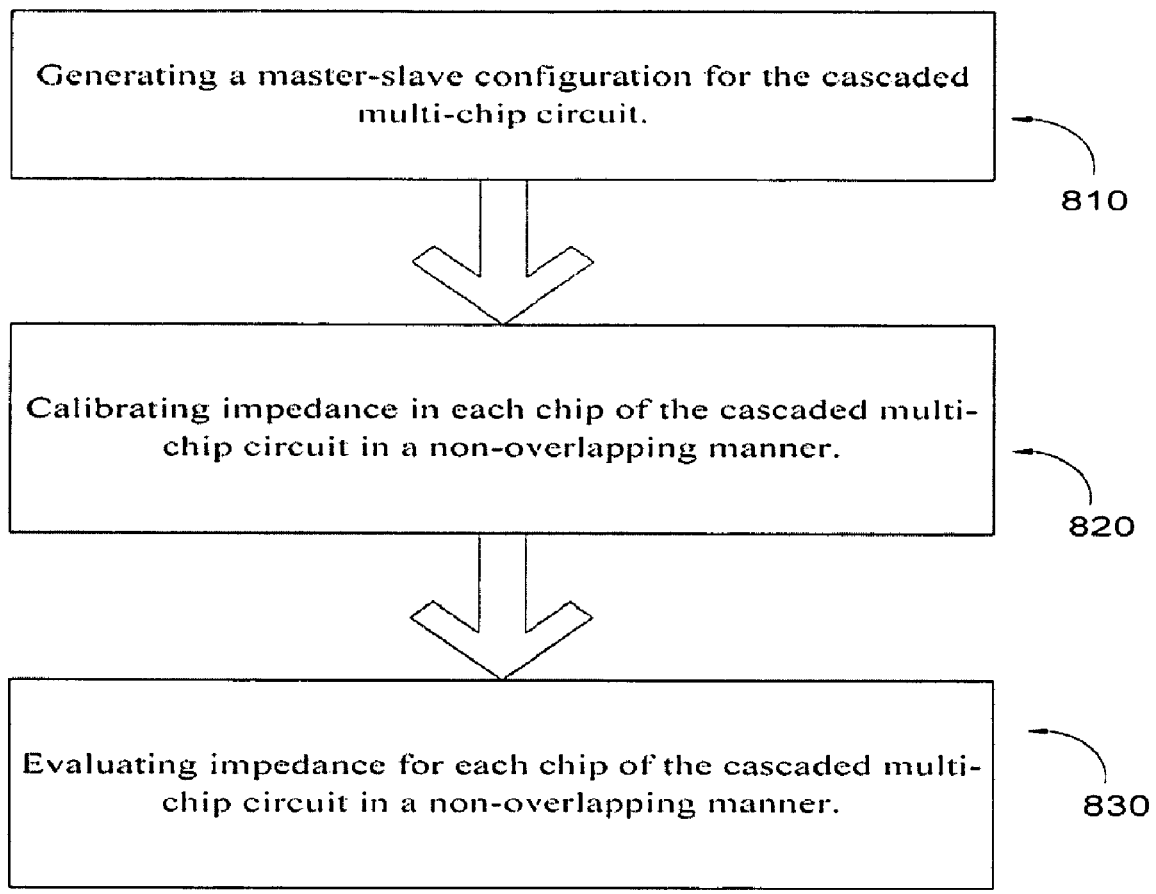
FIG. 8 illustrates a flow chart depicting a method of implementing programmable impedance matching in a cascaded multi-chip circuit in accordance with an exemplary embodiment of the invention.

FIG. 8 illustrates a flow chart 800 depicting a method of implementing programmable impedance matching in a cascaded multi-chip circuit in accordance with an exemplary embodiment of the invention. In a first step 810, a master-slave configuration is generated for the cascaded multi-chip circuit. In a second step 820, impedance is calibrated in each chip of the cascaded multi-chip circuit in a non-overlapping manner. A third step 830 comprises evaluating impedance for each chip of the cascaded multi-chip circuit in a non-overlapping manner. The step of calibrating impedance can include the sub-step of terminating a common impedance line of the cascaded multi-chip circuit with a common precision resistance. The step of generating a master-slave configuration can include the sub-step of coupling a cascade output of a chip to a cascade input of a cascaded chip to enable handshaking within the cascaded multi-chip circuit.

According to an exemplary embodiment, the plurality of cascaded chips, such as those illustrated in FIG. 3, can comprise, for example, a plurality of static random access memory (SRAM) chips, such as, for example, dual data rate (DDR) memory chips, quad data rate (QDR) memory chips, or the like. Advantages of the invention include an improved solution for cascading impedance pin with minimal overhead at the chip level, requiring only two additional pins be added to the, for example, QDR memory chip or the like for achieving cascading. A simplified multi-chip module design is provided through trace reduction on the circuit board. PVT variation in driver impedance between cascaded chips is compensated, since each chip performs its own impedance calibration in a programmable manner.

Exemplary embodiments of the present invention can be used in conjunction with any suitable type of integrated circuit, memory, or processor. A technique and circuit for cascading an impedance matching pin in a programmable manner in a multi-chip environment as discussed above can be used to overcome problems associated with cascading an impedance pin in, for example, a QDR memory multi-chip module or the like. However, the exemplary embodiments of the present invention are not confined to QDR, DDR or SRAM memory chips, and can be extended to impedance matching in an array of any suitable type of cascaded chips.

Embodiments of the present invention are well suited to performing various other steps or variations of the steps recited herein, and in a sequence other than that depicted and/or described herein. In one embodiment, such a process can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Details of the circuit for cascading impedance matching in a programmable manner, and the method of achieving same that are widely known and not relevant to the present discussion have been omitted from the present description for purposes of clarity and brevity.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A programmable impedance matching circuit, comprising:
    a plurality of chips arranged in a cascading configuration,
        wherein a cascade output pin of a chip is coupled to a cascade input pin of a cascade chip to enable handshaking between the plurality of chips,
        wherein the plurality of chips are coupled to a common precision resistor via a common impedance line to enable each chip to calibrate an impedance of the chip, and
        wherein each of the plurality of chips comprises:
            a control circuit,
                wherein the control circuit includes a state machine circuit, and
                wherein the control circuit is configured to control a non-overlapping clock cycle of each chip during which the impedance of the chip is evaluated.

2. The circuit of claim 1, wherein the plurality of chips are arranged in a master and slave configuration.

3. The circuit of claim 1, wherein each control circuit comprises:
    a pull up driver and a pull down driver, and
        wherein the state machine circuit is coupled to both the pull up and the pull down drivers of the control circuit.

4. The circuit of claim 1, wherein the plurality of chips comprises at least one of dual data rate (DDR) memory chips and quad data rate (QDR) memory chips.

5. The circuit of claim 2, wherein the master chip of the plurality of chips is configured to receive a ground level signal, and
    wherein the control circuit of each ship is configured to regulate output impedance.

6. The circuit of claim 1, wherein the control circuit of each chip is configured to control the corresponding state machine to operate each chip with a gap of n clock cycles from one another, and
    wherein n comprises an integer.

7. The circuit of claim 1, wherein a non-overlapping impedance evaluation is performed to control circuit on each of the plurality of chips,
    wherein a gap of n clock cycles is maintained between cascaded chips, and
    wherein n comprises a numerical value.

8. A system for programmable impedance matching, comprising:
    a plurality of chips arranged in a cascaded configuration, each comprising a cascade input pin and a cascade output pin,
        wherein the plurality of cascaded chips is coupled to a common precision resistor, and
        wherein each of the plurality of cascaded chips comprises:
            an impedance controlling state machine,
                wherein each impedance controlling state machine is configured to operate during a non-overlapping clock cycle, and
            wherein the system is configured to regulate output driver impedance for the multi-chip cascaded configuration.

9. The system of claim 8, wherein the system is configured to provide compensation for process, voltage and temperature (PVT) variations between the plurality of cascaded chips.

10. The system of claim 8, wherein the plurality of cascaded chips comprises a plurality of static random access memory (SRAM) chips.

11. The system of claim 10, wherein the plurality of SRAM chips further comprise dual data rate (DDR) memory chips or quad data rate (QDR) memory chips.

12. The system of claim 8, comprising:
    a control circuit in communication with the plurality of cascaded chips,
        wherein the control circuit is configured to perform a pull up and pull down impedance evaluation in each of the plurality of chips.

13. The system of claim 8, wherein one of the plurality of cascaded chips is configured as a master chip, and
    wherein remaining ones of the plurality of cascaded chips are configured as slave chips.

14. A method of programmable impedance matching in a plurality of cascaded chips comprising:
    resetting a control state machine in each of the plurality of cascaded chips after a power-up signal,
        wherein the control state machines are reset during a first period of non-overlapping clock cycles; and
    performing an impedance evaluation for each of the plurality of cascaded chips during a second period of non-overlapping clock cycles.

15. The method of claim 14, wherein the non-overlapping clock cycles are each of length n, and
    wherein n comprises an integer.

16. The method of claim 14, wherein the step of performing comprises:
terminating a common impedance line of the plurality of cascaded chips with a common precision resistor.

17. The method of claim 14, wherein the step of performing comprises:
turning on a pull up replica for each of the plurality of cascaded chips.

18. The method of claim 17, wherein the step of turning on comprises:
evaluating a pull up replica for a master chip during a first clock cycle; and
evaluating pull up replicas for a plurality of slave chips during a plurality of clock cycles occurring after the first clock cycle,
wherein both the first clock cycle and each of the plurality of clock cycles are non-overlapping.

* * * * *